(12) United States Patent
Huang et al.

(10) Patent No.: US 10,474,346 B2
(45) Date of Patent: Nov. 12, 2019

(54) METHOD OF SELECTION OF A PORTION OF A GRAPHICAL USER INTERFACE

(71) Applicant: ORANGE, Paris (FR)

(72) Inventors: Menghuai Huang, Beijing (CN); Zhihong Guo, Beijing (CN)

(73) Assignee: ORANGE, Paris (FR)

( * ) Notice: Subject to any disclaimer, the term of this patent is extended or adjusted under 35 U.S.C. 154(b) by 364 days.

(21) Appl. No.: 14/899,864

(22) PCT Filed: Jun. 27, 2014

(86) PCT No.: PCT/IB2014/001745
§ 371 (c)(1),
(2) Date: Dec. 18, 2015

(87) PCT Pub. No.: WO2015/004525
PCT Pub. Date: Jan. 15, 2015

(65) Prior Publication Data
US 2016/0139764 A1  May 19, 2016

(30) Foreign Application Priority Data

Jun. 28, 2013  (WO) ................ PCT/CN2013/000788

(51) Int. Cl.
G06F 3/0488 (2013.01)
G06F 3/0484 (2013.01)
G06F 3/0483 (2013.01)

(52) U.S. Cl.
CPC .......... G06F 3/0488 (2013.01); G06F 3/0483 (2013.01); G06F 3/04842 (2013.01); G06F 3/04883 (2013.01); G06F 2203/04808 (2013.01)

(58) Field of Classification Search
CPC ............................ G06F 3/04842; G06F 3/017
See application file for complete search history.

(56) References Cited

U.S. PATENT DOCUMENTS

2010/0090971 A1    4/2010  Choi et al.
2012/0056836 A1*   3/2012  Cha .................... G06F 3/04842
                                                    345/173
(Continued)

FOREIGN PATENT DOCUMENTS

CN    102187303 A    9/2011
CN    103608760 A    2/2014
(Continued)

OTHER PUBLICATIONS

Office Action issued in related application CN 201480047407.8, dated Aug. 14, 2018, with English language translation, 15 pages.
(Continued)

Primary Examiner — Rayeez R Chowdhury
(74) Attorney, Agent, or Firm — Drinker Biddle & Reath LLP

(57) ABSTRACT

A method to select a portion of a Graphical User Interface, the method being executed by a mobile device comprising a multi-touch display displaying said Graphical User Interface, the method comprising the acts of detecting two simultaneous touch inputs and selecting a portion of the displayed Graphical User Interface according to the two touch inputs.

10 Claims, 7 Drawing Sheets

(56) References Cited

U.S. PATENT DOCUMENTS

| | | | |
|---|---|---|---|
| 2012/0159386 A1* | 6/2012 | Kang | G06F 3/0481 |
| | | | 715/800 |
| 2012/0287063 A1* | 11/2012 | Chen | G06F 3/0488 |
| | | | 345/173 |
| 2012/0306772 A1* | 12/2012 | Tan | G06F 3/0488 |
| | | | 345/173 |
| 2013/0050111 A1 | 2/2013 | Shibata et al. | |
| 2013/0227419 A1* | 8/2013 | Lee | G06F 9/48 |
| | | | 715/728 |
| 2013/0321305 A1* | 12/2013 | Liang | G06F 3/04883 |
| | | | 345/173 |
| 2014/0362003 A1* | 12/2014 | Kimn | G06F 3/041 |
| | | | 345/173 |

FOREIGN PATENT DOCUMENTS

| | | |
|---|---|---|
| EP | 2 098 947 A2 | 9/2009 |
| JP | 2000-163444 A | 6/2000 |
| JP | 2012-505466 A | 3/2012 |
| JP | 2013-045362 A | 3/2013 |

OTHER PUBLICATIONS

Office Action issued in related application JP 2016-522893, dated Jan. 29, 2018, with English language translation, 9 pages.

* cited by examiner

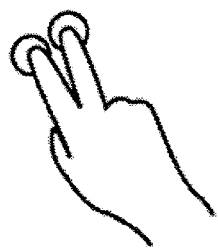
FIGURE 3A  FIGURE 3B
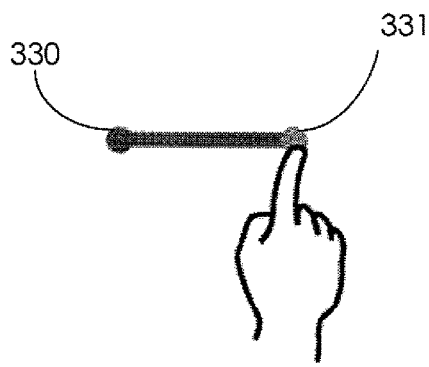
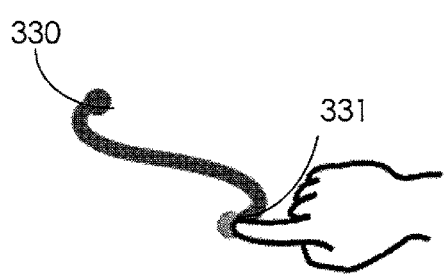
FIGURE 3C  FIGURE 3D

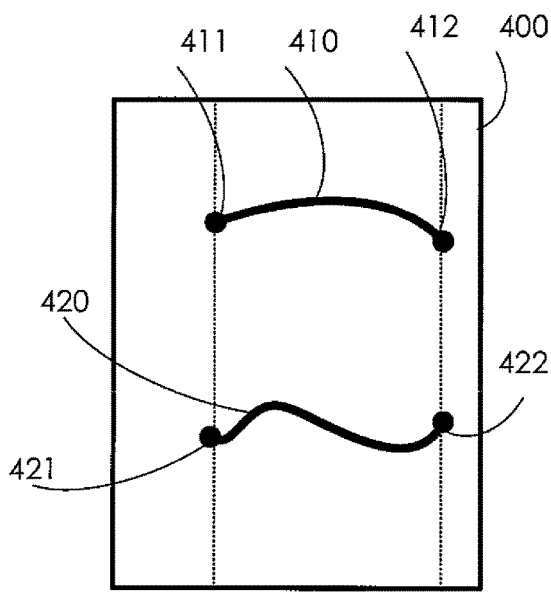 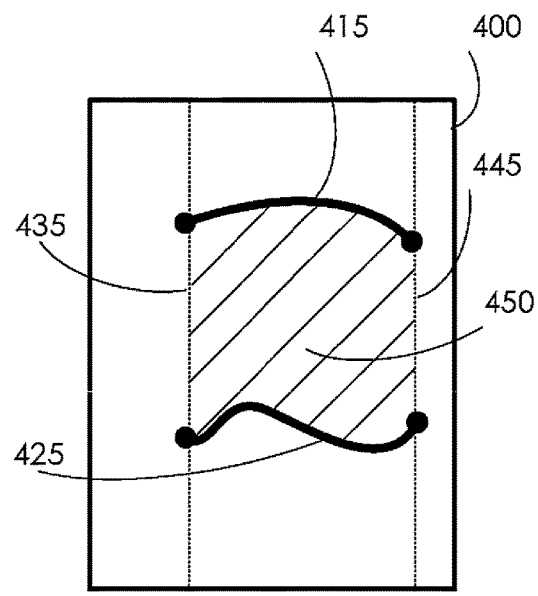
FIGURE 4E  FIGURE 4F

FIGURE 5A
The following are descriptions of illustrative embodiments that when taken in conjunction with the following drawings will demonstrate the above noted features and advantages, as well as further ones.
501
502
FIGURE 5B
550
embodiments that when taken in conjunction with the following drawings will demonstrate the above noted
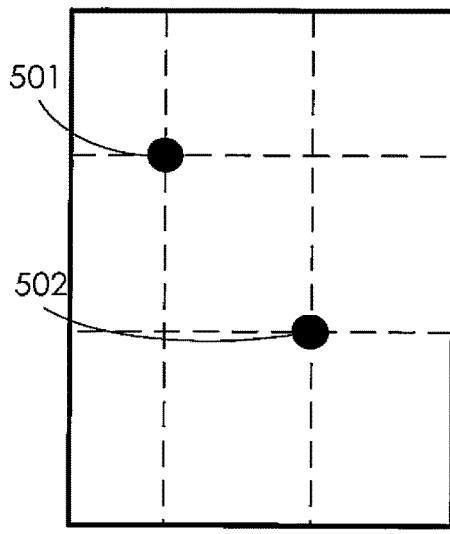
FIGURE 5C
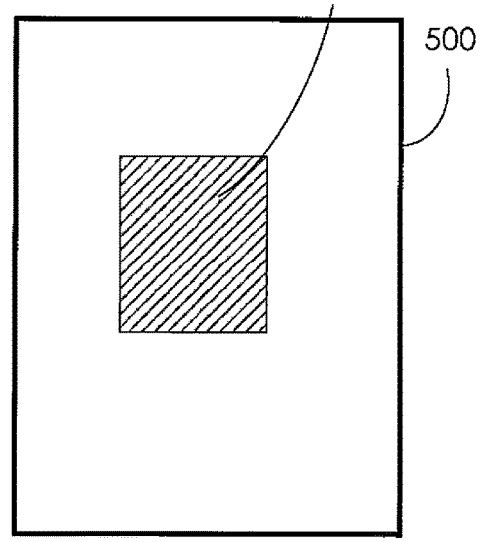
FIGURE 5D

METHOD OF SELECTION OF A PORTION OF A GRAPHICAL USER INTERFACE

CROSS-REFERENCE TO RELATED APPLICATIONS

This application is the U.S. national phase of the International Patent Application No. PCT/IB2014/001745 filed Jun. 27, 2014, which claims the benefit of the International Patent Application No. PCT/CN2013/000788 filed Jun. 28, 2013, the entire content of which is incorporated herein by reference.

FIELD OF THE PRESENT SYSTEM

The present invention generally relates to Graphical User Interface, and more specifically to a method of selection of a portion of a Graphical User Interface displayed on a multi-touch display.

BACKGROUND OF THE PRESENT SYSTEM

Mobile handsets have an inherently impoverished graphical user interface (GUI) with respect to the desktop. Small screens and tiny keyboards are typical of mobile handsets that fit in your pocket. Recent so called smart phones have introduced the use of a touch screen in an attempt to simplify the user experience with his mobile handset. For instance, the touch interface of the iPhone® has revolutionized the mobile handset industry and brought whole new mobile user experiences.

In existing smart phones, application programs (AP) may be controlled using touch inputs. Different touch inputs may control the AP in different ways. For instance, using the example of the iPhone®, the desktop GUI comprising a plurality of AP icons may be seen as an AP itself. A user touching an AP icon will cause a control of the desktop GUI that will launch the AP corresponding to the touched icon. A sliding motion across the desktop GUI, or a drag touch input, will cause another control of the desktop GUI that will display another set of AP icons hidden so far. The user gets a feeling that he is browsing through pages of AP icons to select an interesting application program. A prolonged touch input or clutch input on any AP icon will cause all icons to start shaking around their position. The control associated to the clutch input opens the desktop GUI management. Then the user can delete applications from the desktop or move them around in the desktop layout.

If such a method facilitates the user experience, there is still today a lot of scope for innovation using touch interfaces of electronic devices, mobile or not.

Indeed, user experience on desktop GUI and touch interface GUI are quite often very different, to the advantage of the desktop GUI. Selection of a portion of the GUI, or of the whole GUI like a screenshot, is an intuitive operation on a desktop GUI. Quite often, desktop keyboard does possess a clearly identified "screenshot" key allowing a user to make a screenshot by pressing this one key. Comparing to a touch interface like, for example, Android™ GUI, same result is obtained by pressing two buttons at the same time, and a user will not obtain such result if he has not previously read carefully the user guide as said gesture is not intuitive. It could even be considered as counter-intuitive to go through action of pressing buttons for a GUI mainly based on touch gestures.

Selecting a portion only of the GUI on a desktop GUI is also quite intuitive using a pointing device such as a mouse. Most of the desktop GUI (and desktop AP) reacts to a maintained left click on the mouse followed by a displacement of the mouse by selecting a rectangular portion of the GUI defined by the initial position (i. e. when the left click was detected) of the mouse cursor on the GUI and the actual position of the cursor according to the user displacement of the mouse. On the contrary, on a touch interface GUI, a user may not obtained so easily a selection of a portion of the GUI. For example, on a touch GUI, a user may need to make a screenshot of the entire GUI and then crop the obtained screenshot to the desired portion of the GUI as there is no intuitive way of directly obtaining a screenshot of the desired portion.

More generally, other touch inputs could be used to increase the user experience with touch screens or panels, especially on the selection of portion of GUI.

There is still a need today for a simple an intuitive selection of a portion of a touch interface GUI. There is a further need for novel user experience when selecting portions of a touch interface GUI.

SUMMARY OF THE PRESENT SYSTEM

It is an object of the present system to overcome disadvantages and/or make improvements in the prior art.

Presents system relates to a method to select a portion of a Graphical User Interface, the method being executed by a electronic device comprising a multi-touch display displaying said Graphical User Interface (GUI), the method comprising the acts of detecting two simultaneous touch inputs on the multi-touch display, selecting a portion of the displayed Graphical User Interface according to the two touch inputs.

The method advantageously allows for a user the selection of a portion of a GUI using one single gesture combining for example two fingers. By performing the two simultaneous touch inputs with these fingers, the user may easily select a desired portion of a GUI, easily performing a screenshot of said GUI for example.

The present system also relates to an electronic device with means to implement the method to select a portion of a Graphical User Interface of present system.

Finally, one object of the invention concerns a computer program, in particular computer programs on or in an information medium or memory, suitable for implementing the method for selecting a portion of a Graphical User Interface object of the invention. These programs can use any programming language, and be in the form of source code, binary code, or of code intermediate between source code and object code such as in a partially compiled form, or in any other desirable form for implementing the methods according to the invention.

The information medium may be any entity or device capable of storing the program. For example, the medium can comprise a storage means, such as a ROM, for example a CD ROM or a microelectronic circuit ROM, or else a magnetic recording means, for example a diskette (floppy disk) or a hard disk.

BRIEF DESCRIPTION OF THE DRAWINGS

The invention is explained in further detail, and by way of example, with reference to the accompanying drawings wherein:

FIGS. 3A-3D show exemplary illustration of touch inputs in accordance with embodiments of the present system;

FIGS. 4E-4F show illustrative selection of portion of a GUI according to exemplary embodiments of present system;

FIGS. 5A-5D show illustrative selection of portion of a GUI comprising text according to an exemplary embodiment of present system,

DETAILED DESCRIPTION OF THE PRESENT SYSTEM

Figure 1:
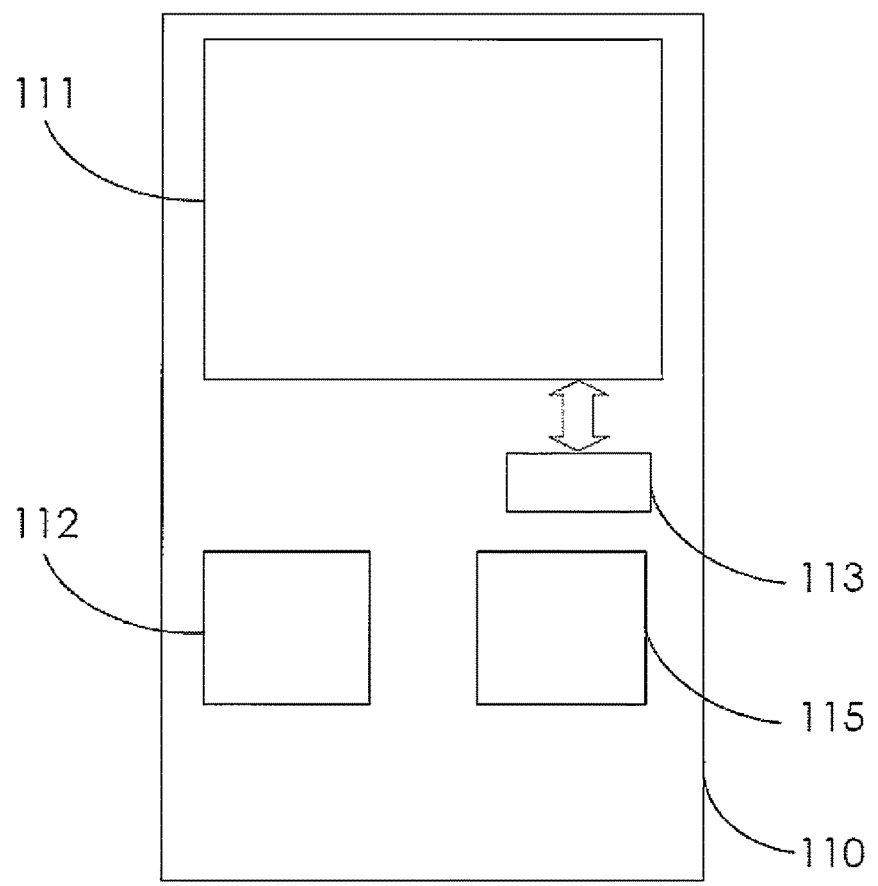
FIG. 1 shows an electronic device in accordance with an embodiment of the present system.

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well known devices, circuits, tools, techniques and methods are omitted so as not to obscure the description of the present system. It should be expressly understood that the drawings are included for illustrative purposes and do not represent the scope of the present system. In the accompanying drawings, like reference numbers in different drawings may designate similar elements.

The term rendering and formatives thereof as utilized herein refer to providing content, such as digital media or a graphical user interface (GUI), such that it may be perceived by at least one user sense, such as a sense of sight and/or a sense of hearing. For example, the present system may render a user interface on a display device so that it may be seen and interacted with by a user. The term rendering may also comprise all the actions required to generate a GUI prior to the display, like e.g. a map representation generated on a server side for a browser application on a user device.

The system, electronic device(s), method, user interface, etc., described herein address problems in prior art systems. In accordance with an embodiment of the present system, an electronic device provides a GUI for controlling an application program (AP) through touch inputs. In the description henceforth, reference will be made to a mobile device or handsets. The man skilled in the art may easily apply the present teachings to any electronic device presenting a touch sensitive panel, referred also hereafter as a touch sensitive display or screen. Multi-touch display should be understood as a touch display capable of detecting more than one touch input simultaneously. Consequently, user inputs or user gesture to interact with the GUI may comprise multiple touch inputs.

A graphical user interface (GUI) may be provided in accordance with an embodiment of the present system:
by an application program (AP) running locally on a device processor, such as part of a computer system of a mobile device, and/or,
as provided by a network connected device, such as a web-based server hosting the application, the GUI being rendered on the mobile device through a local application program connected to the web-based server. Applications like Google Maps® are implemented today using that approach.

The provided visual environment may be displayed by the processor on a display device of the mobile device, namely a touch sensitive panel (touch panel in short), which a user may use to provide a number of touch inputs of different types.

A GUI is a type of user interface which allows a user to interact with electronic devices such as computers, handheld devices, household appliances, office equipment and the likes. GUIs are typically used to render visual and textual images which describe various visual metaphors of an operating system, an application, etc., and implemented on a processor/computer including rendering on a display device. Furthermore, GUIs can represent programs, files and operational functions with graphical images, objects, or vector representations. The graphical images can include windows, fields, dialog boxes, menus, icons, buttons, cursors, scroll bars, maps, etc. Such images can be arranged in predefined layouts, or can be created dynamically (by the device itself or by a web-based server) to serve the specific actions being taken by a user. In general, the user can select and/or activate various graphical images in order to initiate functions and tasks, i.e. controls, associated therewith. By way of example, a user can select a button that opens, closes, minimizes, or maximizes a window, or an icon that launches a particular application program. By way of another example, the GUI may present a typical user interface including a windowing environment and as such, may include menu items, pull-down menu items, icons, pop-up windows, etc., that are typical of those provided in a windowing environment, such as may be represented within a Windows™ Operating System GUI as provided by Microsoft Corporation and/or an OS X™ Operating System GUI, such as provided on an iPhone™, MacBook™, iMac™, etc., as provided by Apple, Inc., and/or another operating system such as Android™ Operating System provided by Google™.

In the description here after, an application program (AP)—or software—may be seen as any tool that functions and is operated by means of a computer, with the purpose of performing one or more functions or tasks for a user or another application program. To interact with and control an AP, a GUI of the AP may be displayed on the mobile device display.

FIG. 1 is an illustration of an exemplary electronic device or mobile device 110 used in the present system. The mobile device 110 comprises a display device 111, a processor 112, a controller 113 of the display device, and an input device 115. Mobile device 110 may be for instance a desktop or laptop computer, a mobile device, a PDA (personal digital assistant) . . . .

In the present system, the user interaction with and manipulation of the application program rendered on a GUI is achieved using the display device 111, or screen, which is presently a multi-touch panel operationally coupled to the processor 112 controlling the displayed interface.

Processor 112 may control the rendering and/or the display of the GUI on the display device 111 depending on the type of application program, i.e. resident or web-based. Processor 112 may also handle the user entries according to the present method. The user entries to interact with an application program may be provided through interactions with the touch panel 111.

The multi-touch panel 111 (in short, the touch panel or touch display) can be seen as an input device allowing interactions with one or more fingers of a user or other devices such as a stylus. The input received from one or more user's touch is sent to the processor 112. The multi-touch panel is configured to detect and report the (location of the) touches to the processor 112 and the processor 112 can interpret the plurality of touches in accordance with the application program and the currently displayed GUI. For example, the processor 112 can initiate a task, i.e. a control of the AP, in accordance with a particular touch.

According to the sensing technology of the multi-touch display, the term "touching" should be here after interpreted for example as "touching", "hovering", "pushing", "pressing" or any other term adapted to the sensing technology used.

In one complementary embodiment, the multi-touch panel and the display element may be separated elements. Alternatively, the multi-touch panel may be transparent and placed over the display element. Otherwise, the present system may be implemented distinguishing between a display element and a multi-touch panel or element. However, for simplicity sake, henceforth, it will be considered that display element and multi-touch panel constitute a multi-touch display, whether separated or not, and the terms multi-touch panel and multi-touch display are indifferently used.

The controller 113, i.e. a dedicated processor, can be used to process the plurality of touches locally and reduce demand for the main processor 112 of the computer system. The multi-touch panel 111 can be based on sensing technologies including but not limited to capacitive sensing, resistive sensing, surface acoustic wave sensing, pressure sensing, optical sensing, and/or the likes. Here after, for simplification purpose, reference will be made to one or more fingers of the user touching panel 111, other devices such as a stylus may be used in place of the user fingers.

In the present system, different types of touch inputs can be monitored through touch panel 111. For instance, the touch panel 111 can be based on single point sensing or multipoint sensing. Single point sensing can be capable of only distinguishing a single touch, while multipoint sensing or multi-touch display can be capable of distinguishing multiple touches that occur at the same time.

In the present system, once the type of touch input has been captured and identified, the captured touch input may be referred to as a touch input event (or touch event in short) that allows imparting a control on the AP.

Slide or swipe gesture should be understood as a gesture or touch input where one or more fingers touch the multi-touch display and move in the same direction. Sliding or swiping gestures are henceforth not distinguished, but it should be noted that sometimes wipe gesture is considered by the man skilled in the art as a slide gesture with somehow shorter movement along the same direction. We shall not make such distinction.

EXEMPLARY EMBODIMENTS OF THE PRESENT SYSTEM AND METHOD

Figure 2A:
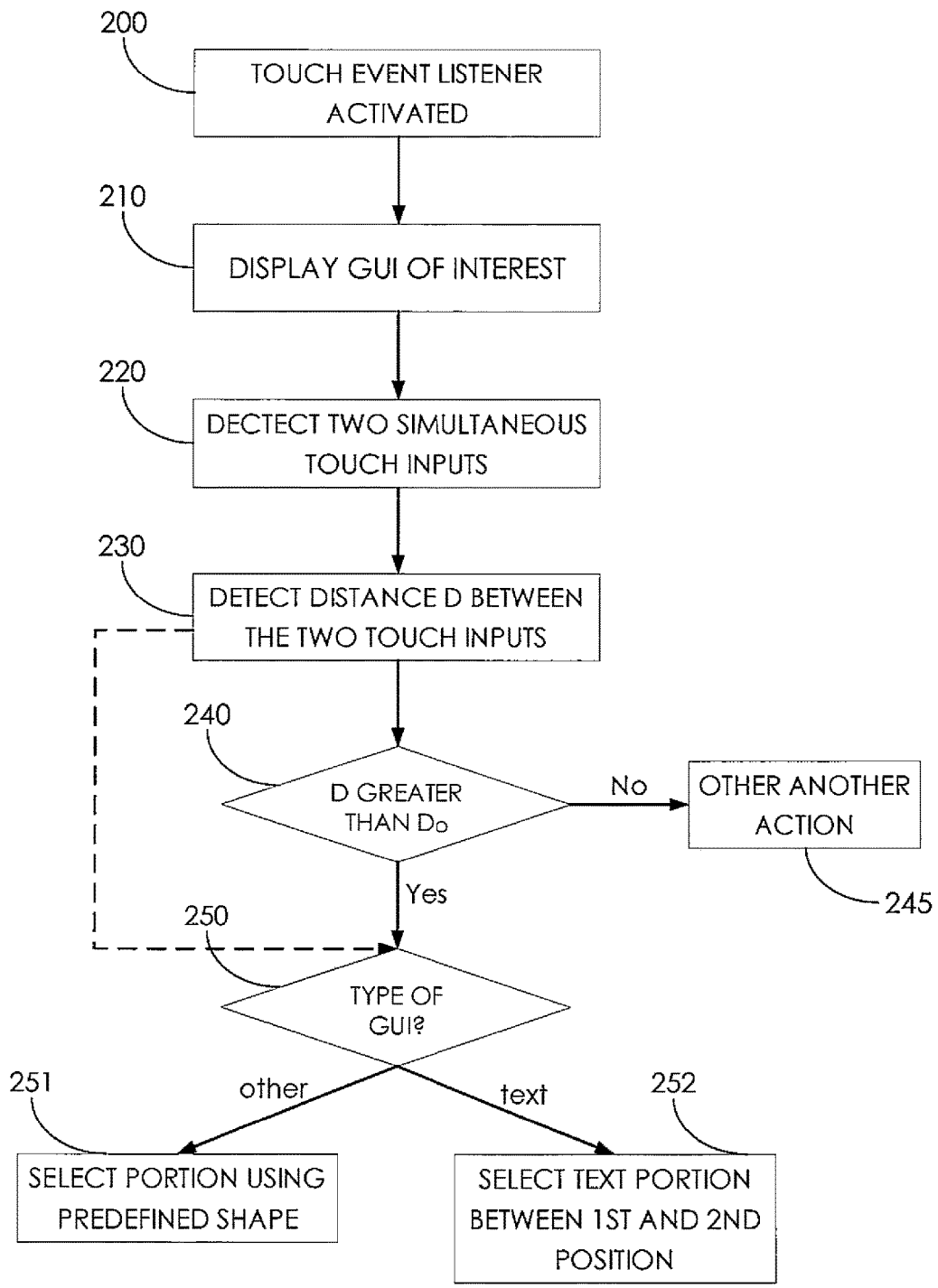
FIG. 2A shows an illustrative process flow diagram in accordance with an embodiment of the present system.

FIG. 2A shows an illustrative process flow diagram in accordance with an embodiment of the present system.

In a first initiation step 200, the electronic device is powered on, the multi-touch display being activated. This means that a touch event listener is activated, which touch event listener capturing one or more input or gesture of the user on the multi-touch display and transmit the information related to the detected touch inputs to the Operating System (OS) executed by the processor 112, possibly through the controller 113 and possibly on a continuous basis. Such information may be transmitted further to an Application Program (AP) executed by the OS, or may directly transmitted by the controller to said AP.

In a step 210, the electronic device renders on the multi-touch display a Graphical User Interface (GUI), possibly the GUI of the Operating System (OS) executed by the electronic device or the GUI of an Application Program executed by said OS. The user may navigate or interact with the displayed GUI according to known technique, using one or more fingers to activate the multi-touch display. As known by the man skilled in the art, such interaction may comprise user gesture using one or more touch inputs, such as touch, taps, sliding or any known touch inputs. A known example of a multi-touch gesture is a zoom in or zoom out using two fingers moving towards or away from each other on a touch interface.

In a step 220, the electronic device detects two simultaneous touch inputs. In other words, the touch event listener transits to the OS or an AP information related to two touch inputs occurring at the same time. Such touch inputs can be of any type, such as tap inputs, press and hold inputs, sliding inputs, and so on. We shall illustrate FIG. 2A embodiment with touch inputs such as tap inputs or press and hold inputs, meaning that each one of the two touch inputs is done on a single point or position of the Graphical User Interface, with possibly a long or short duration. Such touch inputs will be referred to here after as single point or stationary touch inputs, as opposed to sliding or swiping inputs described in relation to FIG. 2B.

By simultaneous touch inputs, it shall be understood that once detected a first touch input, a second touch input is detected within a predefined time windows or time duration. For example, a first touch input is detected, and then 3 milliseconds later a second touch input is detected. In this case, with a hypothesis of a predefined time windows of 5 milliseconds, the system considers that first and second touch inputs are simultaneous. Possibly, the beginning of a touch point or starting moment of the touch input is used—by comparing the time of the two starting moment—to determine if two touch inputs are simultaneous or not. Time window or time duration threshold can be system dependent, set by the user of the electronic device or set by an AP executed on the electronic device, possibly varying on a same electronic device according to which AP renders a GUI on the display (i. e. the OS or an AP among a plurality of AP). We shall distinguish hereafter between simultaneous touch inputs, as defined before, and continuous touch input. Continuous touch input shall refer to a touch input performed during a certain duration of time, possibly with a movement of the point of contact on the multi-touch display. Sliding or swiping gesture as seen later is a continuous touch input. Thus, more generally, two sliding or swiping touch inputs are two continuous touch inputs that may or may not be performed simultaneously.

In a complementary embodiment of present system, the electronic device shall determine in a step 230 the distance D between the two simultaneous touch inputs. Indeed, today, touch interface GUIs can integrate some user gesture or touch inputs that shall be executed by the user using one, two or more fingers. Thus, it is important to be able to determine which touch inputs are performed in order to disambiguate between the existing gestures or touch inputs and the touch input used in present system. Such determination is useful as the two type of user gesture or touch input can coexist:

existing gestures generally require the user to "group" the fingers when executing a multi-touch gesture whereas, as will be detailed hereafter, touch inputs used in the present system are generally not grouped together (otherwise the selected zone or portion would be very small). The distance between the two touch inputs may be defined as the distance between the two starting position of the two touch points on the display. In present case of single point or position touch, the distance is quite straightforward to calculate, but in another embodiment of present system using sliding gestures, such definition could be used. Possibly, for two sliding gestures, meaning touch inputs that could be represented as two portions of line in the display, the distance may be defined as the distance between the two starting point of the gesture, the two ending points, any combination or average based on the two previous definition, or for example the smallest distance between the two portions of lines.

In a step 240, such distance D is compared to a threshold Do. If D is greater than Do then the system considers that two touch inputs according to present embodiment of the system have been detected and next step 250 is executed. Otherwise, the system considers that another multi-touch input has been detected and normal action attached to said multi-touch input is executed in a step 245.

In an optional step 250, according to the embodiment of present system, the system may determine if the GUI is displaying a text content. Alternative embodiment of present system may not execute step 250 and perform directly either step 251 or 252 according to the embodiment. Such determination can be based on information provided by the GUI or by the AP rendering the GUI. It may also depend on the position of the two touch inputs. If may be necessary to have both position of the two touch input over a text content to go to step 252. If only one touch input position is over a text content, the system may act by default according to step 251.

In the step 251, the system select a portion of the GUI using a predefined shape adapted to the two single points or touch inputs on the Graphical User Interface. The embodiment is illustrated on FIGS. 5C and 5D. In such illustration, the selected portion of the GUI corresponds to a rectangle, the two touch points corresponding to a diagonal of the rectangle. The man skilled in the art knows how to define various shapes using two positions on a display.

In the step 252, illustrated in FIGS. 5A and 5B, the two single points on the Graphical User Interface defines respectively a first and a second positions in the text, as shown in 501 and 502. The selecting act further comprising selecting the text portion between the first position 501 and the second position 502 in the text. In one embodiment, as illustrated in FIG. 5A, if a touch input is positioned on a word (here the word "embodiment"), the system may include the word in the selection. The selected text 550 may be copied for example in a memory buffer. Possibly, the selected portion of text may also be highlighted, automatically translated, sent to a text-to-speech application, or any action using text as input.

Figure 2B:
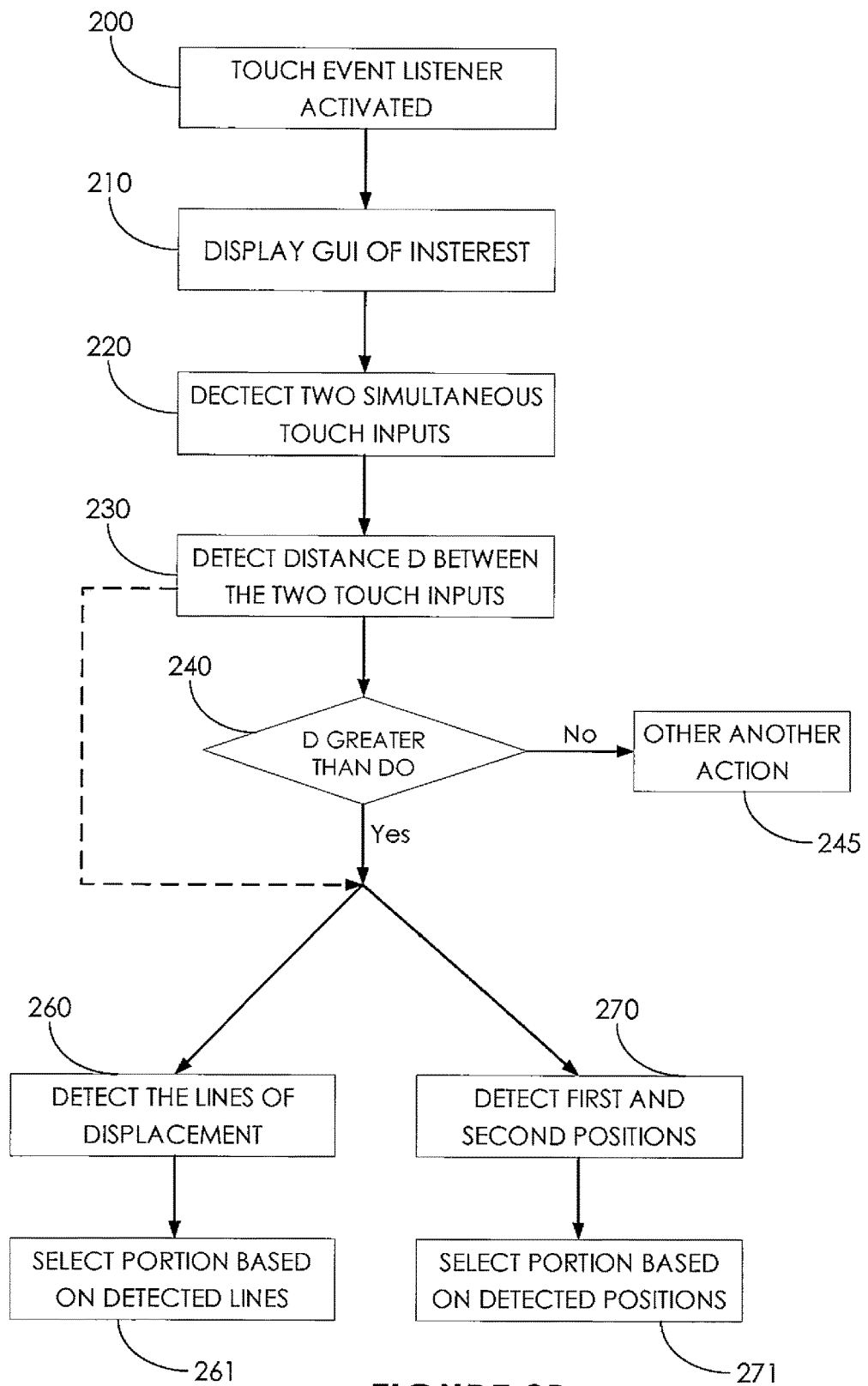
FIG. 2B shows an illustrative process flow diagram in accordance with a complementary embodiment of the present system.

The flowchart of FIG. 2B corresponds to a complementary embodiment of the present system. Henceforth, each one of the simultaneous touch input is a sliding touch input, each sliding touch input being imparted from a first position to a second position on the Graphical User Interface. Such touch input is illustrated in FIG. 3C or 3D. To perform a sliding or swiping gesture, the user touches the screen (starting point 330), moves his finger along the screen and lifts his finger (ending position 331). Classically, a sliding gesture or sliding touch input is shown in FIG. 3C is similar to the gesture shown in FIG. 3C, meaning a straight movement from the starting point 330 to the ending point 331, but alternative gesture shown in FIG. 3D can be considered as a sliding gesture even if the user does not respect a straight movement from the starting point to the ending point.

Steps 200 to 230 are similar to steps already described in FIG. 2A. Again, according to the different embodiments of present system, step 240 may be implemented or not. Considering that the two touch inputs are sliding gesture, the distance between the two touch inputs can be calculated according to different methods. The system may consider the distance between the two starting points, the two ending points, or nay combination of both starting and ending points. In another method of calculation of the distance, the system may calculate the smaller distance between the two segments, one segment being defined by the starting point, the ending point and the movement (or path) between the two points. The man skilled in the art knows several methods to calculate a distance between such two segments. It is to be noted that, as shown in FIG. 3D, segments to be considered may be curved lines.

Two complementary embodiments of present system are described in FIG. 2B: a first complementary embodiment in steps 260 and 261 and a second complementary embodiment in steps 270 and 271. Both embodiments may be implemented together or not.

Figure 4A:
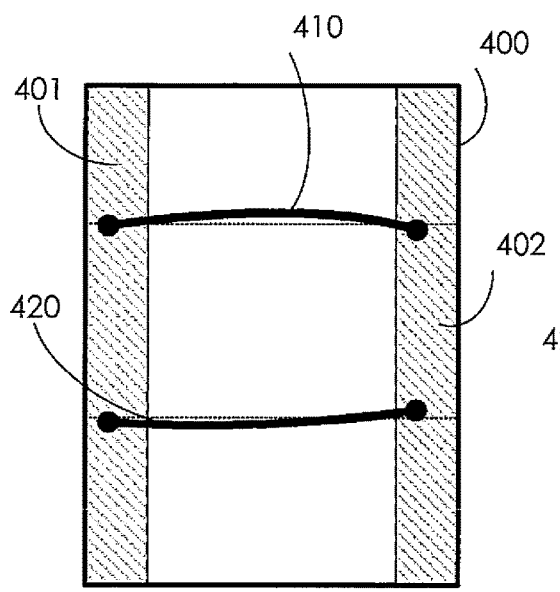
FIGS. 4A-4D show illustrative selection of portion of a GUI according to exemplary embodiments of present system.
Figure 4B:
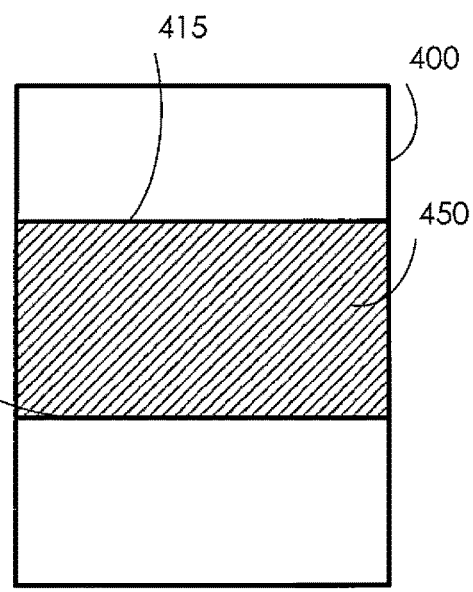

Complementary embodiment described in FIG. 2B, steps 260 and 261, is illustrated by FIGS. 4A and 4B. In a step 260, as shown in FIG. 4A, two sliding touch inputs or lines of displacement 410 and 420 are detected. Indeed, each sliding input defines a line of displacement of the touch input on the GUI. In one embodiment of present system, a sliding gesture 410 or 420, as shown in FIG. 3C, should have a starting point 330 (or first position) located within a predefined zone 401 of the GUI and a ending point 331 (or second position) located within a predefined zone 402 of the GUI to be detected and to trigger the method of selection of a portion of a GUI of the present system. In an alternative embodiment, only the first position or starting point 330 should be located within a predefined zone 401, or, alternatively, only the ending point of second position 331 should be located within a predefined zone 402.

In a step 261, the system deduces from a line of displacement a horizontal line. In other words, such horizontal line may be defined according to the position of the first position or starting point of the sliding touch input, according to the position of the ending point or second position, or according to any combination (such as an average position) of the two positions. By defined, it should be understood for example that the line is defined as the horizontal line going through the first or the second position. Once first and second lines 415 and 425 are defined according to the first and second touch inputs 410 and 420, the system selects a rectangular zone 450 delimited by the first line 415, the second line 425 and the two extremities or edges of the display 400. In other words, selecting a portion 450 of the display 400 is based on each line of displacement 410 and 420. Indeed, the rectangular zone 450 is delimited by the extremities of the display 400 and the two horizontal lines 415 and 425, each horizontal line being deduced from the sliding touch inputs 410 and 420. The man skilled in the art may consider alternative embodiment of present system where horizontal and vertical axis are exchanged.

FIGS. 4E and 4F illustrate an alternative embodiment of steps 260 and 261. In this embodiment, the portion of the display to be selected is defined directly by the two lines of displacement of the touch inputs as shown in 410 and 420. Indeed, as shown in FIG. 4F, the portion of display selected is partly delimited by respectively line 415, corresponding to the displacement of the touch input 410 and line 425, corresponding to the displacement of the touch input 420. If starting (or respectively ending) touch points 411 and 421 (respectively 412 and 422) are not on a same vertical axis, the system may calculate an average position.

Also, in a complementary embodiment of present system, the system may detect two simultaneous sliding touch inputs but may only use one of the two sliding touch inputs to determine a portion of the display for selection. Indeed, the selected portion of the display 400 may be delimited by three predefined extremities of the display 400 and only one of the two lines of displacement 415 or 425. Considering two horizontal lines of displacement, the three predefined extremities of the display should comprise the two vertical extremities or edges in order to define a closed surface.

Predefined zones 401 and 402 are defined in order to limit the risk of confusion of the sliding touch inputs with any other touch input. In other words, such zones are defined to facilitate the detection of the two sliding touch inputs by improving the disambiguation.

Figure 4C:
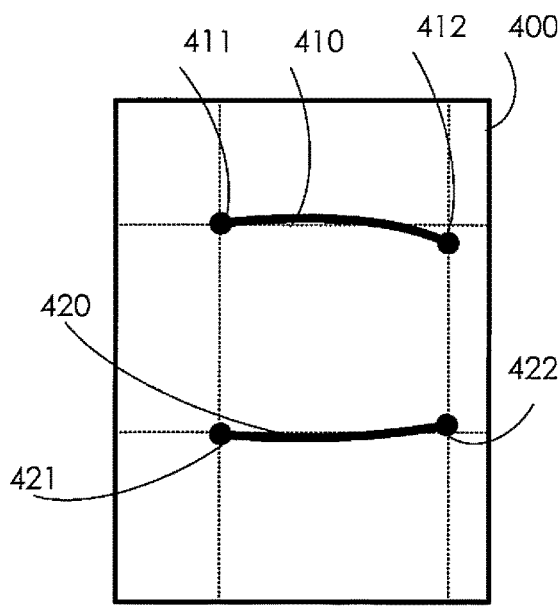
Figure 4D:
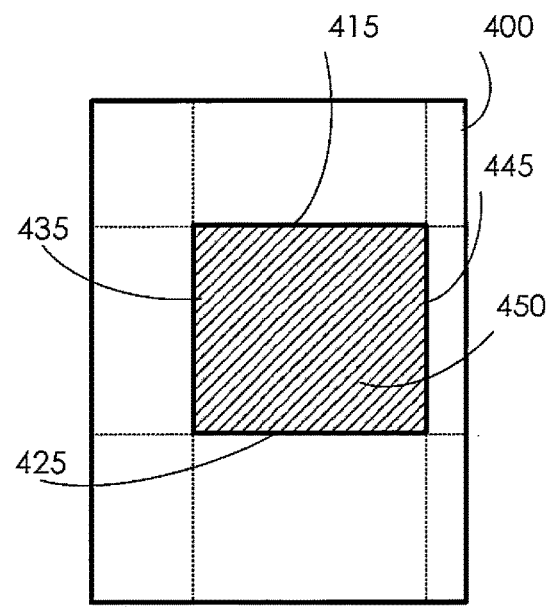

Complementary embodiment described in FIG. 2B, steps 270 and 271, is illustrated in FIGS. 4C and 4D. In such complementary embodiment, selecting a portion of the display 400 is based on the two first positions (411 and 421) and the two second positions (412 and 422) of the two sliding touch inputs 410 and 420. Lines of displacement 415 and 425 are determined according to the method described in previous complementary embodiment. Such lines of displacements define here the two sides 415 and 425 of a rectangular portion 450 of the display 400. Side 425 is defined according to the first position 411 and the second position 421. Side 435 may be defined as the vertical line going through the first position 411, or going through the second position 421, or going through any combination of the first and second position 411 and 421. Side 445 is defined like side 435, but along a vertical axis and using the second positions 412 and 422 instead of first positions 411 and 421.

FIGS. 3A-3D show exemplary illustration of touch inputs in accordance with embodiments of the present system.

FIG. 3A shows an exemplary illustration of two simultaneous touch inputs made by a user using two fingers. The user may touch the screen with his two fingers and lift them up or possibly one or two fingers may touch the screen and stay in place. Difference resides in the duration of the contact of a finger with the multi-touch display 111. Such duration may be OS or AP dependent, possibly configurable by the user.

FIG. 3B shows an exemplary illustration of a sliding or swiping gesture. In this case, two fingers touch the screen and move in the same direction. For each gesture of a finger, a starting point 330 and an ending point 331 can de defined, as shown in FIG. 3C or 3D. FIG. 3C illustrates a sliding or swiping gesture with a straight movement, whereas 3D illustrates a possible sliding gesture where the movement of the finger follows a possibly complex curve.

FIGS. 4A-D show illustrative selection of portion of a GUI according to exemplary embodiments of present system and has been previously described.

FIGS. 5A-5B show illustrative selection of portion of a GUI comprising text according to an exemplary embodiment of present system and has been previously described.

The methods of the present system are particularly suited to be carried out by a computer software program, such program containing modules corresponding to one or more of the individual steps or acts described and/or envisioned by the present system, such as the different engines, the application program, the user interface engine, etc. Such program may of course be embodied in a computer-readable medium, such as an integrated chip, a peripheral device or memory, such as a memory (not shown in FIG. 1) coupled to the processor 112.

The computer-readable medium and/or memory may be any recordable medium (e.g., RAM, ROM, removable memory, CD-ROM, hard drives, DVD, floppy disks or memory cards) or may be a transmission medium utilizing one or more of radio frequency (RF) coupling, Bluetooth coupling, infrared coupling, etc. Any medium known or developed that can store and/or transmit information suitable for use with a computer system may be used as the computer-readable medium and/or memory.

Additional memories may also be used. These memories configure processor 112 to implement the methods, operational acts, and functions disclosed herein. The operation acts may include controlling the rendering device 530 to render elements in a form of a GUI and/or controlling the rendering device 530 to render other information in accordance with the present system.

Moreover, the term "memory" should be construed broadly enough to encompass any information able to be read from or written to an address in the addressable space accessed by a processor. With this definition, information on a network is still within the present memory, for instance, because the processor 112 may retrieve the information from the network for operation in accordance with the present system. For example, a portion of the memory as understood herein may reside as a portion of the content providers, and/or the user device.

The processor 112 is capable of providing control signals and/or performing operations in response to input signals from the user input device 111 and executing instructions stored in the memory. The processor 112 may be an application-specific or general-use integrated circuit(s). Further, the processor 112 may be a dedicated processor for performing in accordance with the present system or may be a general-purpose processor wherein only one of many functions operates for performing in accordance with the present system. The processor 112 may operate utilizing a program portion, multiple program segments, or may be a hardware device utilizing a dedicated or multi-purpose integrated circuit.

Finally, the above discussion is intended to be merely illustrative of the present system and should not be construed as limiting the appended claims to any particular embodiment or group of embodiments. Thus, while the present system has been described with reference to exemplary embodiments, including user interfaces, it should also be appreciated that numerous modifications and alternative embodiments may be devised by those having ordinary skill in the art without departing from the broader and intended spirit and scope of the present system as set forth in the claims that follow. For example, the user inputs may be provided through a device like a stylus and a finger, two styluses or a stylus with 2 extremities (similar to a fork for example). Other applications would readily occur to a person of ordinary skill in the art and art intended to be encompassed in the description of the present system. Further, while exemplary user interfaces are provided to facilitate an understanding of the present system, other user interfaces may be provided and/or elements of one user interface may be combined with another of the user interfaces in accordance with further embodiments of the present system.

The section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or an preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements, and;

j) unless specified otherwise in a description of an embodiment of present system, the term "greater than" (respectively "lower than") should be understood as "strictly greater than" (resp. "strictly lower than") or "greater than or equal to" (resp. "lower than or equal to"), both implementation being possible.

What is claimed is:

1. A method to select a portion of a Graphical User Interface, the method being executed by an application embodied on an electronic device comprising a multi-touch display displaying said Graphical User Interface, said multi-touch display being capable of detecting more than one touch input simultaneously, the method comprising the acts of:

detecting, by the multi-touch display, two simultaneous touch inputs performed by a user on the multi-touch display; and selecting, by the electronic device, a portion of the displayed Graphical User Interface according to the two detected touch inputs, wherein each one of the simultaneous touch inputs is a sliding touch input, the first of said sliding touch inputs being imparted from a first starting position to a first ending position on the Graphical User Interface, the second of the sliding touch inputs being imparted from a second starting position to a second ending position on the Graphical User Interface, wherein a line of displacement of the touch input is defined by the electronic device from each sliding input on the Graphical User Interface, the selecting act further comprising selecting, by the electronic device, a portion based on each line of displacement and deducing from said each line of displacement, by the electronic device, a horizontal line going through said first or said second starting position and a vertical line going through said first or said second ending position, or a vertical line going through said first or said second starting position and a horizontal line going through said first or said second ending position.

2. The method according to claim 1, wherein each one of the simultaneous touch inputs is a touch input on a single point of the Graphical User Interface.

3. The method according to claim 2, wherein the selecting act further comprises:

selecting a portion using a predefined shape adapted to the two single points on the Graphical User Interface.

4. The method according to claim 2, wherein the Graphical User Interface comprises a text, the two single points on the Graphical User Interface defining respectively a first and second positions in the text, the selecting act further comprising:

selecting the text portion between the first and second positions in the text.

5. The method according to claim 1, wherein the selecting act further comprises:

selecting a portion based on the two first positions and the two second positions.

6. The method according to claim 1, wherein the detecting act further comprises:

detecting the distance between the two simultaneous touch inputs, the selecting act being carried out if the detected distance is greater than a predefined threshold.

7. The method according to claim 6, further comprising the act of:

imparting a predefined action different than the selection of a portion, when the detected distance is smaller than the predefined threshold.

8. The method according to claim 1, wherein the performed action comprises highlighting the selected portion on the Graphical User Interface.

9. An electronic device comprising a multi-touch display for rendering a Graphical User Interface, the electronic device further comprising a processor arranged to:

detect two simultaneous touch inputs on the multi touch display; and select a portion of the displayed Graphical User Interface according to the two simultaneous sliding touch inputs, wherein each one of the simultaneous touch input is a sliding touch input, a first of said sliding touch inputs being imparted from a first starting position to a first ending position on the Graphical User Interface, a second of said sliding touch inputs being imparted from a second starting position to a second ending position on the Graphical User Interface, wherein each sliding touch input defines a line of displacement of the sliding touch input on the Graphical User Interface, the selection of a portion further comprising selecting a portion based on each line of displacement and deducing from said each line of displacement a horizontal line going through said first or said second starting position and a vertical line going through said first or said second ending position, or a vertical line going through said first or said second starting position and a horizontal line going through said first or said second ending position.

10. The method according to claim 1, wherein the selected portion on the Graphical User Interface is a selected text displayed portion on the Graphical User Interface, the method further comprising performing at least one of:

copying the selected text displayed on the Graphical User Interface in a memory buffer of the electronic device;
automatically translating the selected text displayed on the Graphical User Interface;
sending the selected text displayed on the Graphical User Interface to a text-to-speech application; and
highlighting the selected text displayed on the Graphical User Interface.

\* \* \* \* \*